United States Patent
Katoh et al.

(10) Patent No.: US 8,594,377 B2
(45) Date of Patent: Nov. 26, 2013

(54) IMAGE RECOGNITION APPARATUS

(75) Inventors: Tetsuhiro Katoh, Kobe (JP); Kimitaka Murashita, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 195 days.

(21) Appl. No.: 13/227,746

(22) Filed: Sep. 8, 2011

(65) Prior Publication Data
US 2012/0099763 A1    Apr. 26, 2012

(30) Foreign Application Priority Data
Oct. 26, 2010    (JP) ................. 2010-239346

(51) Int. Cl.
*G06K 9/00*    (2006.01)
(52) U.S. Cl.
USPC ............................ 382/103; 382/104
(58) Field of Classification Search
USPC .................................. 382/103, 104
See application file for complete search history.

(56) References Cited

U.S. PATENT DOCUMENTS

| | | | | |
|---|---|---|---|---|
| 5,638,116 A * | 6/1997 | Shimoura et al. | ............ | 348/118 |
| 6,285,393 B1 * | 9/2001 | Shimoura et al. | ............ | 348/119 |
| 6,990,397 B2 * | 1/2006 | Albou et al. | ................... | 701/49 |
| 7,599,521 B2 * | 10/2009 | Watanabe et al. | ............ | 382/104 |
| 8,050,458 B2 * | 11/2011 | Azuma | ........................ | 382/104 |
| 8,212,878 B2 * | 7/2012 | Shima et al. | ............ | 348/207.99 |
| 8,355,539 B2 * | 1/2013 | Tan et al. | ...................... | 382/104 |
| 8,391,556 B2 * | 3/2013 | Kuehnle et al. | ............... | 382/104 |
| 8,396,299 B2 * | 3/2013 | Sakurai | ........................ | 382/201 |
| 2007/0165909 A1 * | 7/2007 | Leleve et al. | ................. | 382/104 |
| 2011/0115912 A1 * | 5/2011 | Kuehnle | ........................ | 348/148 |

FOREIGN PATENT DOCUMENTS

JP    A-8-276787    10/1996
JP    A-2007-215169    8/2007

* cited by examiner

*Primary Examiner* — Uptal Shah
(74) *Attorney, Agent, or Firm* — Oliff & Berridge, PLC

(57) ABSTRACT

An image recognition part of an image recognition apparatus recognizes an object based on a target area in an outside-vehicle image obtained by a camera installed in a vehicle. A position identifying part identifies an optical axis position of the camera relative to the vehicle based on the outside-vehicle image, and an area changing part changes a position of the target area in the outside-vehicle image according to the optical axis position of the camera. Therefore, it is possible to recognize an object properly based on the target area in the outside-vehicle image even though the optical axis position of the camera is displaced.

20 Claims, 16 Drawing Sheets

IMAGE RECOGNITION APPARATUS

BACKGROUND OF THE INVENTION

1. Field of the Invention

The invention relates to technologies for recognizing an object based on an image.

2. Description of the Background Art

Recently, an image recognition apparatus for recognizing an object based on an outside-vehicle image, which is obtained by a camera installed in a vehicle and shows a periphery of the vehicle, is proposed. This image recognition apparatus is considered to be used in a variety of applications in a vehicle.

The image recognition apparatus, for example, recognizes an object based on an outside-vehicle image and in a case where there is an object having a possibility of collision, the image recognition apparatus warns a user of the possibility of collision. Thereby, the user can drive in consideration of the object. In addition, the image recognition apparatus recognizes an object based on an outside-vehicle image and transmits a signal that indicates existence of the recognized object to a vehicle controller for controlling a behavior of the vehicle. Thereby, the vehicle controller can control the behavior of the vehicle in consideration of the object.

To fulfill a recognition function of this image recognition apparatus properly, an optical axis of a camera is needed to point in a predetermined direction relative to the vehicle. However, the optical axis of the camera, which is installed so as to point in the predetermined direction, may be displaced with age. For this reason, the image recognition apparatus for informing a user that the optical axis of the camera is changed largely from the predetermined direction in a case where the optical axis of the camera is changed largely from the predetermined direction is proposed. Thereby, the user can adjust the optical axis of the camera to the predetermined direction by such information being informed.

However, it is quite a trouble for a user to adjust an optical axis of the camera every time the image recognition apparatus detects displacement of the optical axis position. Therefore, improvements were required.

SUMMARY OF THE INVENTION

According to one aspect of this invention, an image recognition apparatus that recognizes an object based on an image, includes: a recognition unit that recognizes the object based on a target area in an image obtained by a camera installed in a vehicle; an identifying unit that identifies an optical axis position of the camera relative to the vehicle based on the image; and a changing unit that changes a position of the target area in the image according to the optical axis position identified by the identifying unit.

The position of the target area in the image is changed according to the optical axis position of the camera, and therefore, the object can be recognized properly based on the target area even though the optical axis position of the camera is displaced.

According to another aspect of this invention, the image recognition apparatus further includes: a derivation unit that derives an amount of displacement of the optical axis position from an initial position based on the image; and an informing unit that informs a user that the amount of displacement is more than a threshold value in a case where the amount of displacement is more than a threshold value.

In the case where the amount of displacement of the optical axis position of the camera from the initial position is more than the threshold value, a user is informed of the displacement. Thereby, the user can recognize that the optical axis position of the camera is displaced largely.

According to another aspect of this invention, the image recognition apparatus further includes: a derivation unit that derives an amount of displacement of the optical axis position from an initial position based on the image; and an adjustment unit that adjusts the optical axis position in a case where the amount of displacement is more than a threshold value.

In the case where the amount of displacement of the optical axis position of the camera from the initial position is more than the threshold value, the optical axis position is adjusted. Thereby, a user can skip a step to adjust the optical axis position of the camera even though the optical axis position of the camera is displaced largely.

Therefore, an object of the invention is to recognize an object properly based on a target area even though an optical axis position of a camera is displaced.

These and other objects, features, aspects and advantages of the invention will become more apparent from the following detailed description of the invention when taken in conjunction with the accompanying drawings.

DESCRIPTION OF THE EMBODIMENTS

Hereinbelow, embodiments of this invention are explained with reference to the attached drawings.

<1. First Embodiment>

Figure 1:
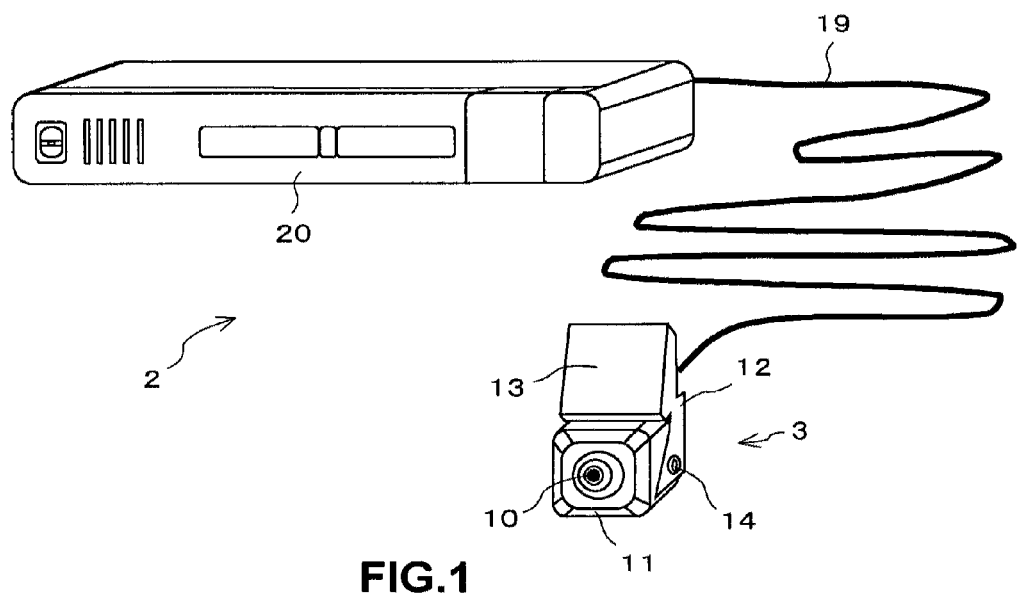
FIG. 1 shows an appearance of an image recognition apparatus.

FIG. 1 shows an appearance of an image recognition apparatus 2 in the first embodiment. This image recognition apparatus 2 is installed in a vehicle (hereinafter, referred to as an "own vehicle") and mainly includes a body part 20 and a camera 3. The body part 20 and the camera 3 are electrically connected through a cable 19, and they can transmit/receive a signal mutually. The camera 3 captures a surrounding area of an own vehicle and obtains an outside-vehicle image that shows surroundings of the own vehicle. The body part 20 recognizes another vehicle running around the own vehicle based on a target area in an outside-vehicle image obtained by the camera 3. In addition, in a case where the body part 20 recognizes another vehicle and there is a high possibility of collision between the own vehicle and another vehicle, the body part 20 warns a user of the high possibility of collision between the own vehicle and another vehicle. Furthermore, the body part 20 identifies an optical axis position of the camera 3 and changes a position of the target area in an outside-vehicle image according to the optical axis position. Hereinbelow, a configuration and processing of the image recognition apparatus 2 having such functions are explained in detail.

<1-1. Configuration of Camera>

First, a configuration of the camera 3 is explained. As shown in FIG. 1, the camera 3 includes an optical lens 10, a chassis 11 and a holding part 12. The optical lens 10 is an optical device that focuses light. An angle of view of the optical lens 10 is, for example, 45 degrees. The chassis 11 is a chassis that stores parts such as the optical lens 10 and an imaging device (illustration is omitted). The holding part 12 is a holding member that holds the chassis 11. The chassis 11 is fixed to the holding part 12 with a screw 14. It is possible to adjust an angle of the chassis 11 relative to the holding part 12 by the screw 14 being loosened. The holding part 12 includes a mounting surface 13 touching with an inner surface of a windshield of an own vehicle by plane contact.

Figure 2:
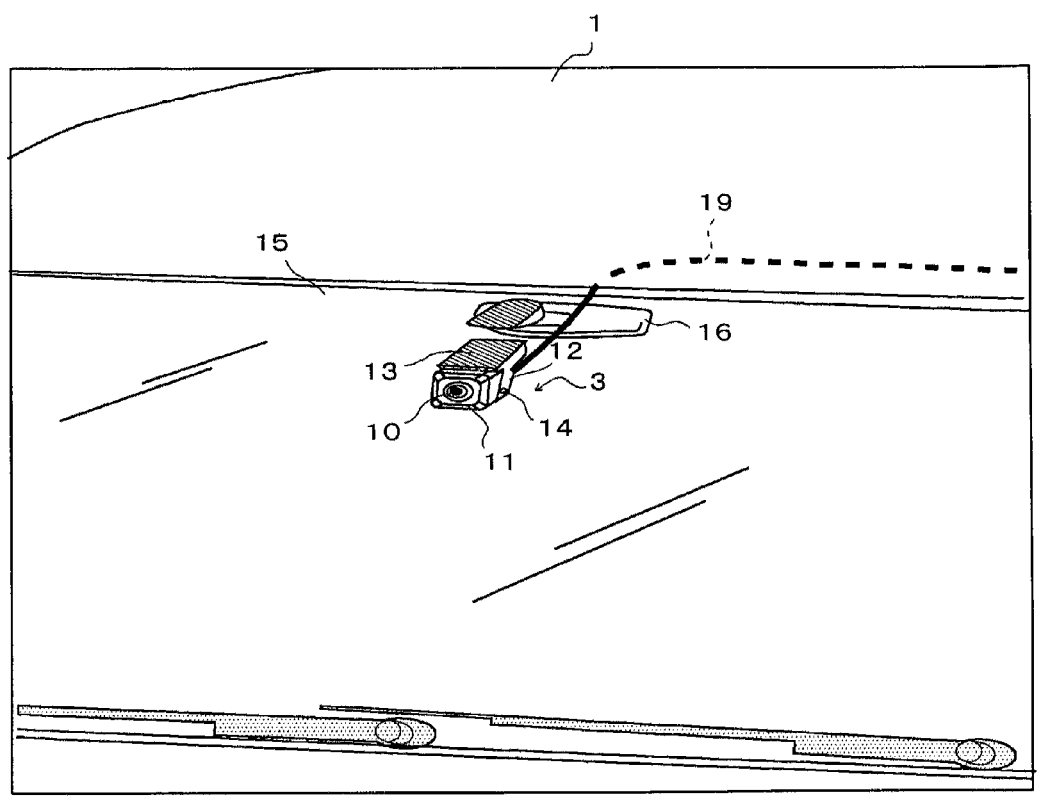
FIG. 2 shows condition in which a camera is installed in a vehicle.

FIG. 2 shows condition in which the camera 3 is installed in an own vehicle 1. The camera 3 is installed in a cabin of the own vehicle 1 by the mounting surface 13 of the holding part 12 being touched with an inner surface of a windshield 15 by plane contact. The mounting surface 13 has a double-sided tape and the mounting surface 13 is fixed to the windshield 15 with this double-sided tape. Thereby, the holding part 12 is adhered near a rearview mirror 16 installed on the inner surface of the windshield 15.

Figure 3:
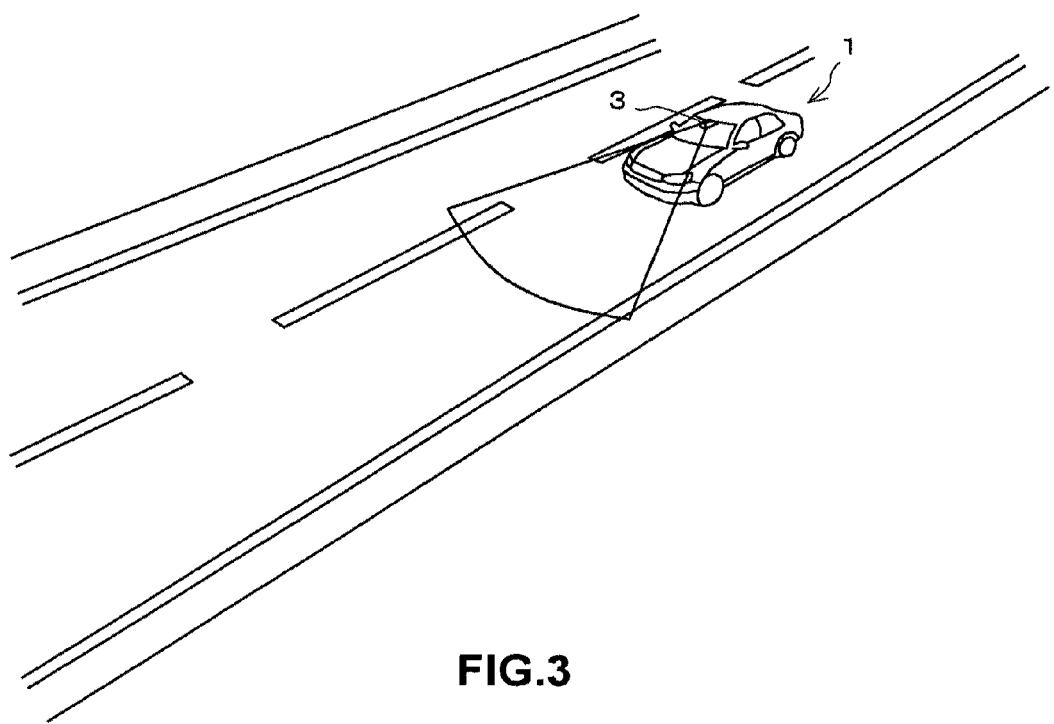
FIG. 3 shows a direction in which an optical axis of a camera is pointed.

In this way, the chassis 11 is fixed relative to the own vehicle 1 by the holding part 12 being adhered in the inner surface of the windshield 15. In other words, an optical axis of the camera 3 (an optical axis of the optical lens 10) is pointed in a predetermined direction with reference to the own vehicle 1. Thereby, as shown in FIG. 3, an optical axis of the camera 3 is pointed to the front of the own vehicle 1. Therefore, the camera 3 captures a forward area of the own vehicle 1 and obtains an outside-vehicle image showing the forward area of the own vehicle 1.

However, the chassis 11 may move relative to the holding part 12 due to loosening of the screw 14 caused by aging and the like. In this way, if the chassis 11 moves relative to the holding part 12, an optical axis position of the camera 3 relative to the own vehicle 1 is displaced from a predetermined direction. Normally, the optical axis of the camera 3 is displaced downward relative to the own vehicle 1 with age.

<1-2. Configuration of Body Part>

Figure 4:
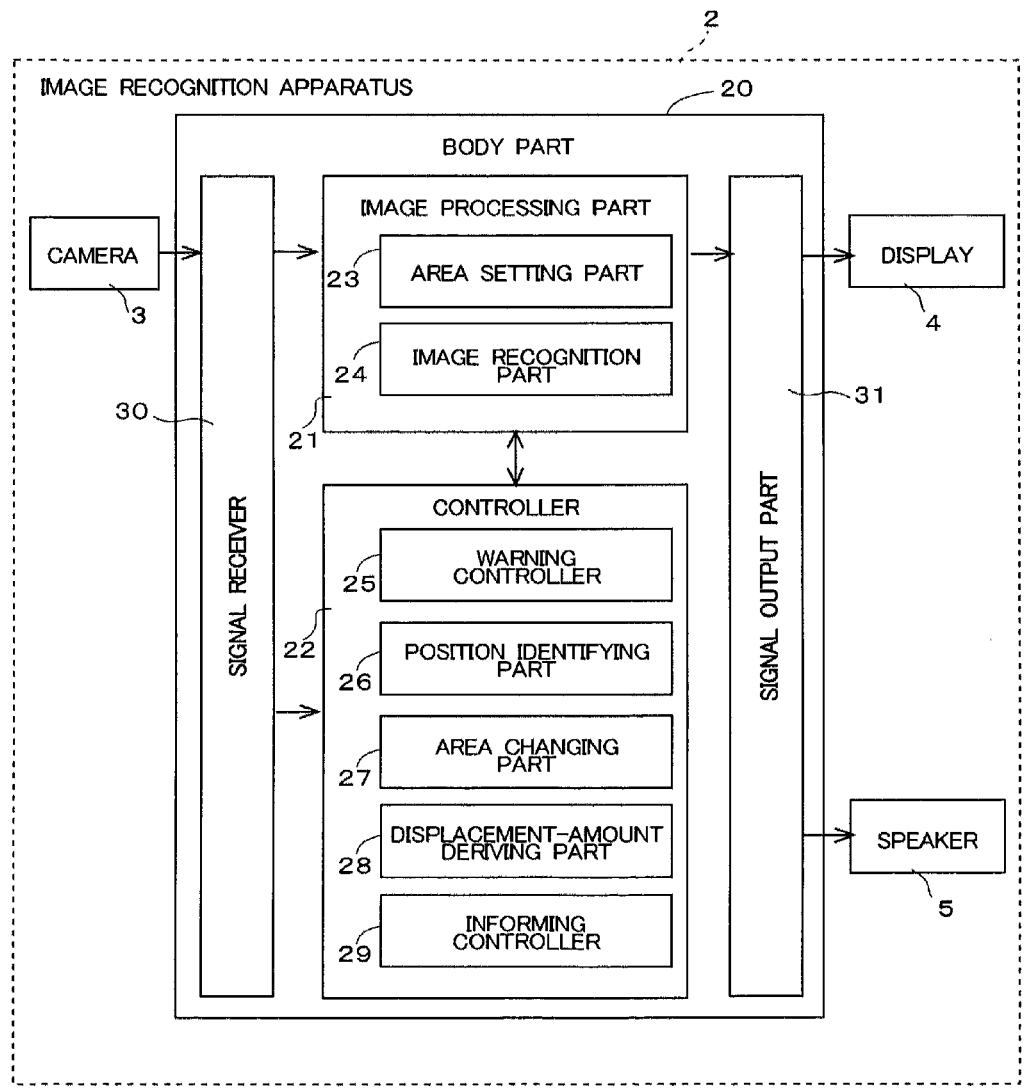
FIG. 4 mainly shows a configuration of a body part of a first embodiment.

Next, a configuration of the body part 20 is explained. FIG. 4 mainly shows the configuration of the body part 20. The body part 20 includes a rectangular solid chassis and this chassis stores a variety of electronic parts. The body part 20 mainly includes an image processing part 21, a controller 22, a signal receiver 30 and a signal output part 31.

The image processing part 21 is, for example, a hardware circuit such as ASIC and has functions to perform a variety of image processing. As a part of the functions, the image processing part 21 includes an area setting part 23 and an image recognition part 24. The area setting part 23 sets a target area that is an area intended for a process of recognizing an object, in an outside-vehicle image obtained by the camera 3. The image recognition part 24 recognizes an object based on the target area in the outside-vehicle image. In this embodiment, the image recognition part 24 recognizes a preceding vehicle that is another vehicle running in front of the own vehicle 1, as an object.

The controller 22 includes a microcomputer and controls the image recognition apparatus 2 overall. A microcomputer, for example, includes CPU, ROM, RAM and the like. A variety of functions as the controller 22 are performed by CPU performing arithmetic processing in accordance with a program stored in ROM. The controller 22 includes a warning controller 25, a position identifying part 26, an area changing part 27, a displacement-amount deriving part 28 and an informing controller 29 as a part of functions performed by arithmetic processing.

The warning controller 25 takes control to warn a user to avoid a collision between the own vehicle 1 and a preceding vehicle in a case where the image recognition part 24 recognizes the preceding vehicle.

The position identifying part 26 identifies an optical axis position of the camera 3 relative to the own vehicle 1 based on an outside-vehicle image.

The area changing part 27 changes a position of the target area in the outside-vehicle image according to the optical axis position of the camera 3.

The displacement-amount deriving part 28 derives an amount of displacement of the optical axis position of the camera 3 from an initial position. The initial position is the optical axis position of the camera 3 at the time the camera 3 is first installed in the own vehicle 1 at a factory or a sales company of the own vehicle 1. In other words, the optical axis position of the camera 3, which is pointed in a predetermined direction relative to the own vehicle 1 so that the image recognition apparatus 2 fulfills recognition functions properly, is the initial position.

In a case where the amount of displacement of the optical axis position of the camera 3 from the initial position is more than a predetermined threshold value, the informing controller 29 takes control to inform a user that the amount of displacement of the optical axis position of the camera 3 from the initial position is more than the predetermined threshold value.

The signal receiver 30 is connected with the camera 3 electrically and is an interface to receive a signal from the camera 3. The signal receiver 30 receives an outside-vehicle image obtained by the camera 3 and inputs the outside-vehicle image to the image processing part 21 and the controller 22.

The signal output part 31 is connected with a display 4 and a speaker 5 electrically and is an interface to transmit a signal to the display 4 and the speaker 5. The signal output part 31 outputs the outside-vehicle image and the like processed by the image processing part 21 to the display 4 so that the display 4 displays the outside-vehicle image and the like. In addition, the signal output part 31 transmits a signal to the speaker 5 so that the speaker 5 outputs sound.

<1-3. Function of an Image Processing Part>

Next, functions of the image processing part 21 (the area setting part 23 and the image recognition part 24) are explained in more detail.

The area setting part 23 sets a target area in an outside-vehicle image. The image processing part 21 obtains the outside-vehicle image from the camera 3 in a predetermined cycle. The area setting part 23 sets the target area on respective outside-vehicle images obtained in such a predetermined cycle. The area setting part 23 sets a part of an area of the outside-vehicle image as the target area.

The image recognition part 24 recognizes a preceding vehicle based on such a target area set in the outside-vehicle image. The image recognition part 24 recognizes the preceding vehicle using a pattern matching method. Concretely, the image recognition part 24 extracts a subject image included in the target area, and then recognizes the subject image as an image of the preceding vehicle in a case where a shape of the subject image approximates a standard pattern indicating a vehicle.

If the image recognition part 24 recognizes a preceding vehicle by covering the whole area of the outside-vehicle image, a processing load for the recognition is extremely high. Therefore, the image recognition part 24 recognizes the preceding vehicle by covering a target area that is a part of the outside-vehicle image, so that the processing load is reduced.

It is preferable that the target area is determined in the position where there is a high possibility that an image of the preceding vehicle appears in the outside-vehicle image. In the outside-vehicle image, an image of the preceding vehicle and a vanishing point often overlap. Therefore, the target area is set so that the target area includes the vanishing point corresponding to a theoretical infinite distance in the outside-vehicle image. In fact, the vanishing point is a point where images of a plurality of lines which are parallel to one another (e.g. a lane mark, etc.) are extended and intersect in the outside-vehicle image on which a subject image is represented in perspective.

Figure 5:
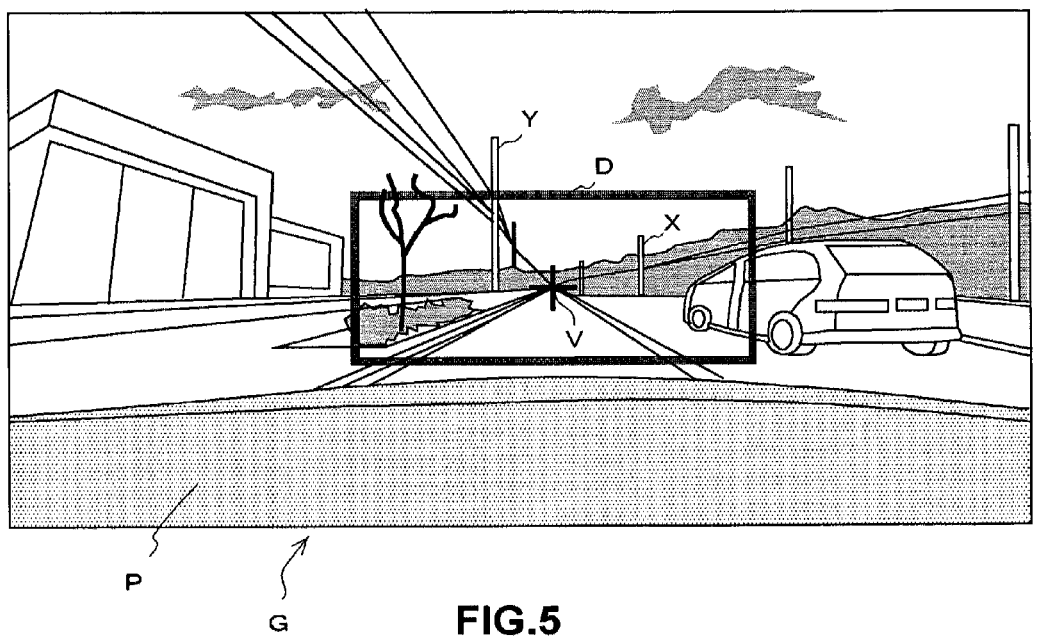
FIG. 5 shows an exemplary outside-vehicle image.

FIG. 5 shows an example of an outside-vehicle image G that is obtained by the camera 3 and shows a forward view of the own vehicle 1. As shown in FIG. 5, a target area D is set so that the target area D includes a vanishing point V in the outside-vehicle image G. In this way, a preceding vehicle is recognized by covering only the target area D set in the outside-vehicle image G, and therefore a processing load for the recognition of the preceding vehicle can be reduced.

<1-4. Process of a Controller>

Next, functions of the controller 22 (the warning controller 25, the position identifying part 26, the area changing part 27, the displacement-amount deriving part 28 and the informing controller 29) are explained in more detail.

First, the warning controller 25 is explained. The warning controller 25 examines a possibility of collision between the own vehicle 1 and a preceding vehicle in a case where the preceding vehicle is recognized by the image recognition part 24. The warning controller 25 examines the possibility of collision between the own vehicle 1 and the preceding vehicle based on a relative distance between the own vehicle 1 and the preceding vehicle, and relative acceleration between the own vehicle 1 and the preceding vehicle.

The warning controller 25 derives the relative distance based on a size of an image of the preceding vehicle in an outside-vehicle image. In addition, the warning controller 25 derives the relative acceleration based on a change in the size of the image of the same preceding vehicle respectively included in a plurality of consecutive outside-vehicle images. Then the warning controller 25 examines the possibility of collision between the own vehicle 1 and the preceding vehicle with reference to a table stored in ROM of the controller 22 based on the derived relative distance and relative acceleration. In this table, a criterion value indicating the possibility of collision (possibility of contact) is stored, corresponding to the relative distance and relative acceleration.

In addition, the warning controller 25 warns a user to avoid the collision in a case where the criterion value indicating the possibility of collision is higher than a predetermined threshold value. Concretely, the warning controller 25 transmits a signal to the speaker 5 so that the speaker 5 outputs warning sound inside a cabin of the own vehicle 1. The warning controller 25 changes volume level of warning sound output by the speaker 5 according to the criterion value indicating the possibility of collision.

Next, the position identifying part 26 is explained. The position identifying part 26 identifies an optical axis position of the camera 3 relative to the own vehicle 1 based on an outside-vehicle image. In a case where the optical axis position of the camera 3 relative to the own vehicle 1 is changed, a vanishing point position in the outside-vehicle image is also changed. Therefore, the position identifying part 26 substantively identifies the optical axis position of the camera 3 relative to the own vehicle 1 by deriving the vanishing point position in the outside-vehicle image.

When the vanishing point position in the outside-vehicle image is derived, first, an image of an object commonly included in a plurality of consecutive outside-vehicle images is identified. Then the position of the image of the applicable object in each of a plurality of consecutive images is determined. An object used in this time is, for example, a telephone pole and the like existing along a road on which a vehicle is running. The position identifying part 26 derives a plurality of lines parallel to one another actually from the position of the image of such an object. Then the position identifying part 26 derives the position of a point where these plural lines intersect, as the vanishing point position.

Figure 6:
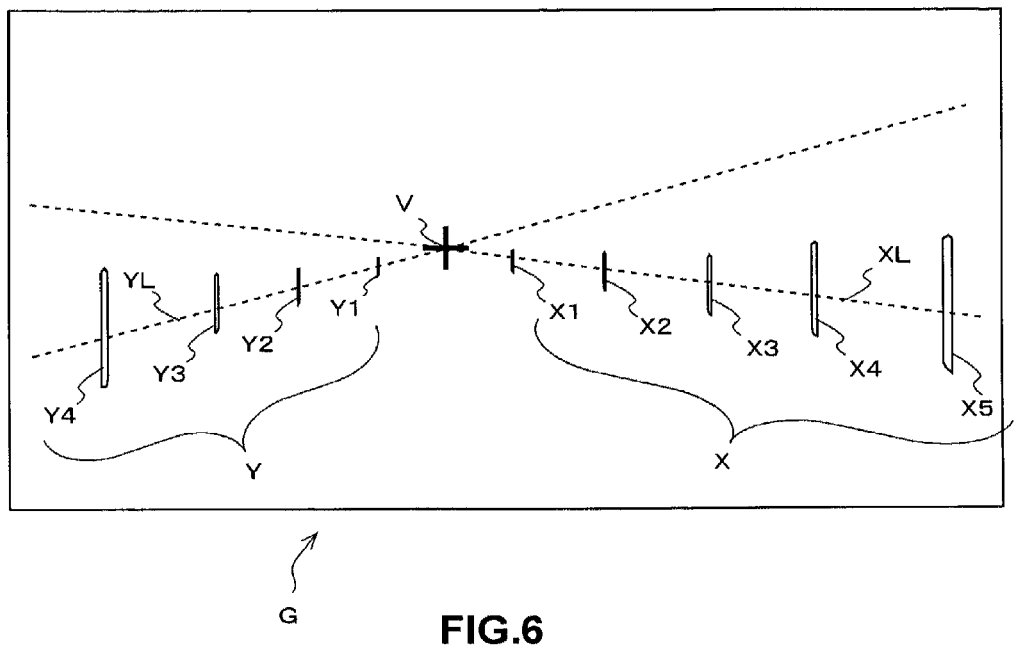
FIG. 6 is a diagram to explain a method to derive a vanishing point position.

For example, the outside-vehicle image G shown in FIG. 5 includes a telephone pole image X and Y along a road on which a vehicle is running. As shown in FIG. 6, the position identifying part 26 derives a plurality of lines XL and YL parallel to one another actually based on a position of the telephone pole image X and Y in each of a plurality of consecutive outside-vehicle images G. On a plurality of consecutive outside-vehicle images G, the telephone pole image X exists in a position X1, X2, X3, X4 and X5 respectively. The line XL is derived by connecting the approximate middles of these telephone pole images X. Also, in a plurality of consecutive outside-vehicle images G, the telephone pole images Y exists in a position Y1, Y2, Y3, Y4 and Y5 respectively. The line YL is derived by connecting the approximate middles of these telephone pole images Y. Then, a position of a point where the line XL and YL intersect by extending those lines is the vanishing point position V.

In a case where a vanishing point position in an outside-vehicle image is changed from the vanishing point position (hereinafter, referred to as a "previous position") at the time when the area changing part 27 changed the position of the target area last time, the position identifying part 26 derives the amount of change of the vanishing point position from the previous position.

Figure 7:
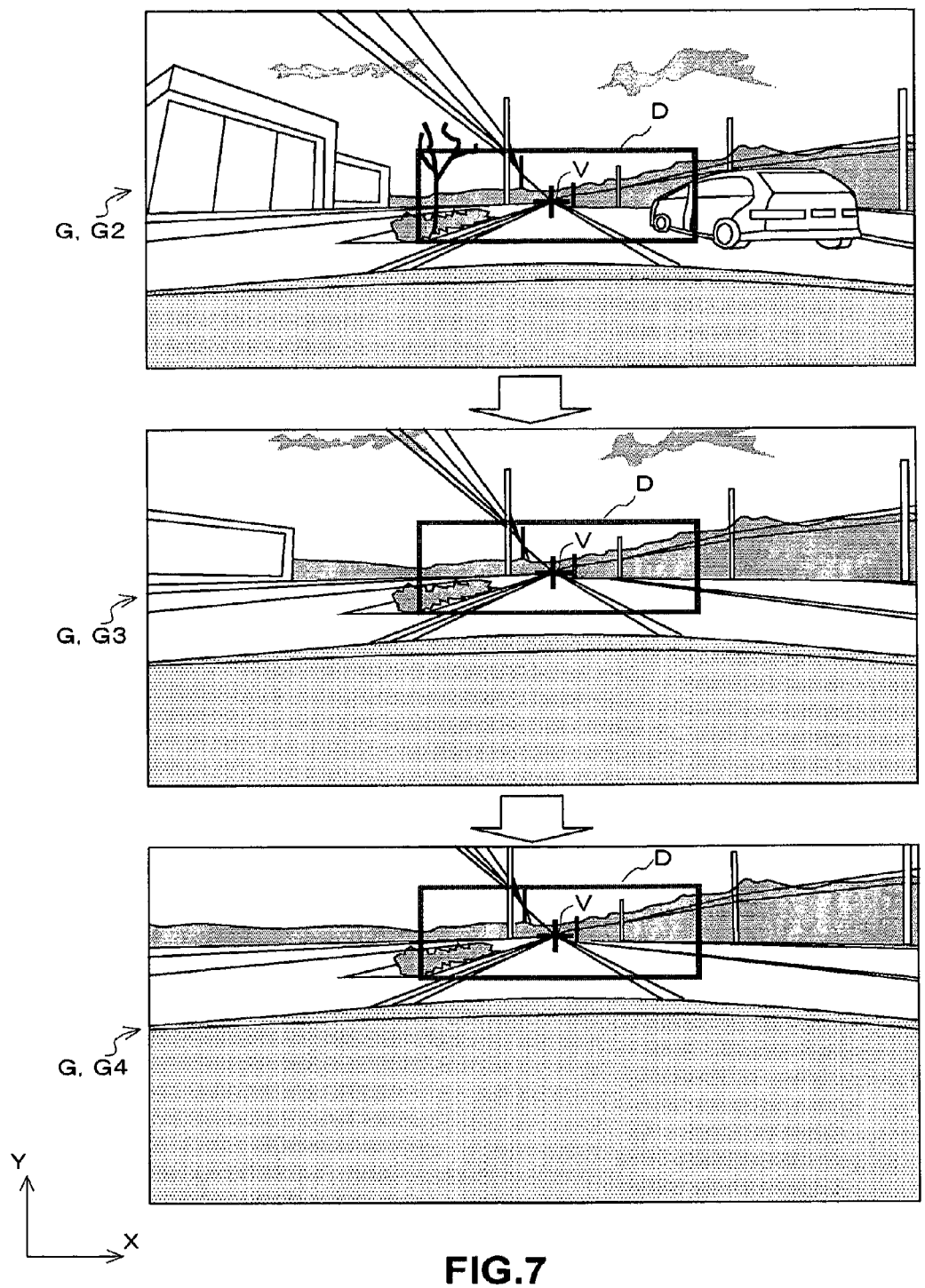
FIG. 7 shows a change of a vanishing point position.

If an optical axis position of the camera 3 is displaced relative to the own vehicle 1 due to aged deterioration and the like, the vanishing point position in the outside-vehicle image is also displaced. For example, as shown in FIG. 7, the vanishing point V exists in approximately the middle in a vertical direction of an outside-vehicle image G2. However, the vanishing point V exists above the middle in a vertical direction of an outside-vehicle image G3 obtained after time has passed, and the vanishing point V exists further above in an outside-vehicle image G4 obtained after further time has passed.

In the case where the vanishing point position is displaced in this way, the position identifying part 26 derives the amount of change of the vanishing point position from the previous position. For example, in a case where the outside-vehicle image G3 shown in FIG. 7 is obtained, if the previous position is the same as the position of the vanishing point V in the outside-vehicle image G2, the amount of change of the position of the vanishing point V in the outside-vehicle image G3 relative to the position of the vanishing point V in the outside-vehicle image G2 is derived. Also, in a case where the outside-vehicle image G4 shown in FIG. 7 is obtained, if the previous position is the same as the position of the vanishing point V in the outside-vehicle image G3, the amount of change of the position of the vanishing point V in the outside-vehicle image G4 relative to the position of the vanishing point V in the outside-vehicle image G3 is derived.

Next, the area changing part 27 is explained. The area changing part 27 changes a position of a target area in an outside-vehicle image according to an optical axis position of the camera 3. In other words, the area changing part 27 changes the position of the target area in the outside-vehicle image according to the vanishing point position in the outside-vehicle image.

The area changing part 27 changes the position of the target area to be set by the area setting part 23, based on the amount of change of the vanishing point position derived by the position identifying part 26. For example, if the position of the vanishing point V in the outside-vehicle image G3 is changed by 25 pixels to an upward direction (plus side on Y-axis) relative to the position (the previous position) of the vanishing point V in the outside-vehicle image G2 shown in FIG. 7, the area changing part 27 changes the position of the target area D in the outside-vehicle image by 25 pixels to the upward direction (plus side on Y-axis). Also if the position of the vanishing point V in the outside-vehicle image G4 is changed by 30 pixels to an upward direction (plus side on Y-axis) relative to the position (the previous position) of the vanishing point V in the outside-vehicle image G3, the area changing part 27 changes the position of the target area D in the outside-vehicle image by 30 pixels to an upward direction (plus side on Y-axis).

In a case where an optical axis position of the camera 3 is changed to a downward direction relative to the own vehicle 1, a vanishing point position in an outside-vehicle image is changed to an upward direction in this way. Thus, in the case where the optical axis position of the camera 3 is changed to a downward direction relative to the own vehicle 1 (relative to a previous optical axis position), the area changing part 27 changes the position of the target area in the outside-vehicle image to an opposite direction, an upward direction.

In a case where the optical axis position of the camera 3 is changed to an upward direction relative to the own vehicle 1 (relative to a previous optical axis position), the vanishing point position in the outside-vehicle image is changed to the opposite direction, a downward direction. Therefore, in this case, the area changing part 27 changes the position of the target area in the outside-vehicle image to a downward direction. In a case where the optical axis position of the camera 3 is changed leftward relative to the own vehicle 1 (relative to a previous optical axis position), the area changing part 27 changes the position of the target area in the outside-vehicle image to the opposite direction, the right. In a case where the optical axis position of the camera 3 is changed rightward relative to the own vehicle 1 (relative to a previous optical axis position), the area changing part 27 changes the position of the target area in the outside-vehicle image to the opposite direction, the left.

Next, the displacement-amount deriving part 28 is explained. The displacement-amount deriving part 28 derives an amount of displacement of the optical axis position of the camera 3 from an initial position. Concretely, the displacement-amount deriving part 28 derives the amount of displacement of the vanishing point position from the vanishing point position (hereinafter, referred to as "reference position") in the outside-vehicle image in a case where the optical axis position of the camera 3 is in the initial position. In this way, the displacement-amount deriving part 28 substantively derives the amount of displacement of the optical axis position of the camera 3 from the initial position by deriving the amount of displacement of the vanishing point position from the reference position.

The displacement-amount deriving part 28 derives the amount of displacement of the vanishing point position by accumulating the amount of change of the vanishing point position derived in the past. For example, if the area changing part 27 has changed the position of the target area twice and the amount of change of the vanishing point position at that time was 25 pixels and 30 pixels respectively, 55 pixels by accumulation of 25 pixels and 30 pixels is equal to the amount of displacement of the vanishing point position from the reference position. The displacement-amount deriving part 28 is allowed to directly derive the amount of displacement of the vanishing point position from the reference position, based on the reference position and the vanishing point position derived by the position identifying part 26.

Next, the informing controller 29 is explained. In a case where the amount of displacement of the optical axis position of the camera 3 from the initial position is more than a predetermined threshold value, the informing controller 29 takes control to inform a user that the amount of displacement of the optical axis position of the camera 3 from the initial position is more than the predetermined threshold value. Concretely, the informing controller 29 judges whether the amount of displacement of the vanishing point from the reference position, derived by the displacement-amount deriving part 28, is more than a predetermined threshold value or not. In the case where the amount of displacement of the vanishing point is more than the threshold value, the informing controller 29 judges that the amount of displacement of the optical axis position of the camera 3 is more than the predetermined threshold value. In this case, the informing controller 29 outputs a predetermined signal to the display 4 and the speaker 5 so that the display 4 and the speaker 5 inform a user that the optical axis position of the camera 3 needs to be adjusted.

A threshold value is set to a value equivalent to the case where the optical axis of the camera 3 is moved to the degree that a preceding vehicle cannot be recognized. As described previously, the area changing part 27 changes the position of the target area according to the displacement of the optical axis position of the camera 3. However, in a case where one end of the target area contacts with an edge of an outside-vehicle image and if the optical axis position of the camera 3 is displaced further, it is not possible to make a further change to the position of the target area in the direction of the edge of the outside-vehicle image. In other words, it is not possible to recognize a preceding vehicle. Thus, the amount of displacement of the vanishing point equivalent to the case where one end of the target area contacts with an edge of the outside-vehicle image is set as the threshold value. It is acceptable to inform a user that the optical axis position of the camera 3 should be adjusted in the case where one end of the target area contacts with an edge of the outside-vehicle image.

Such a process makes it possible to inform a user that the optical axis of the camera 3 is displaced to the degree that a preceding vehicle cannot be recognized. Also a user can understand that an adjustment of the optical axis of the camera 3 is required.

<1-5. Flow of Process>

Next, a flow of process performed by the image recognition apparatus 2 is explained.

Figure 8:
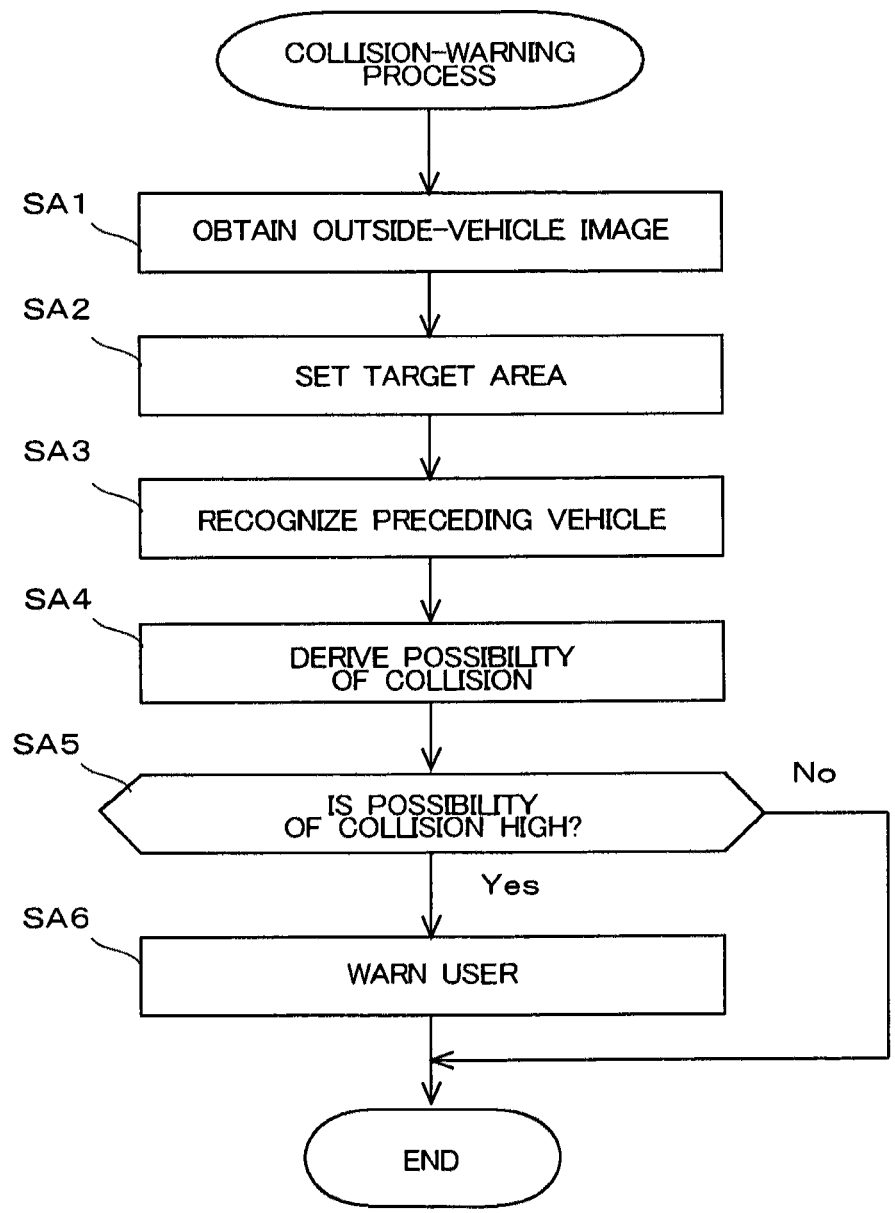
FIG. 8 shows a flow of a collision-warning process.

FIG. 8 shows a flowchart of a collision-warning process that is a main process to be performed by the image recognition apparatus 2. In the collision-warning process, a preceding vehicle is recognized and a warning is given to a user in a case where there is a high possibility of collision between the own vehicle 1 and the preceding vehicle. The collision-warning process shown in FIG. 8 is repeated in a predetermined cycle (e.g. 1/30 seconds) after the image recognition apparatus 2 is powered on and a predetermined operation is begun by a user.

Figure 9:
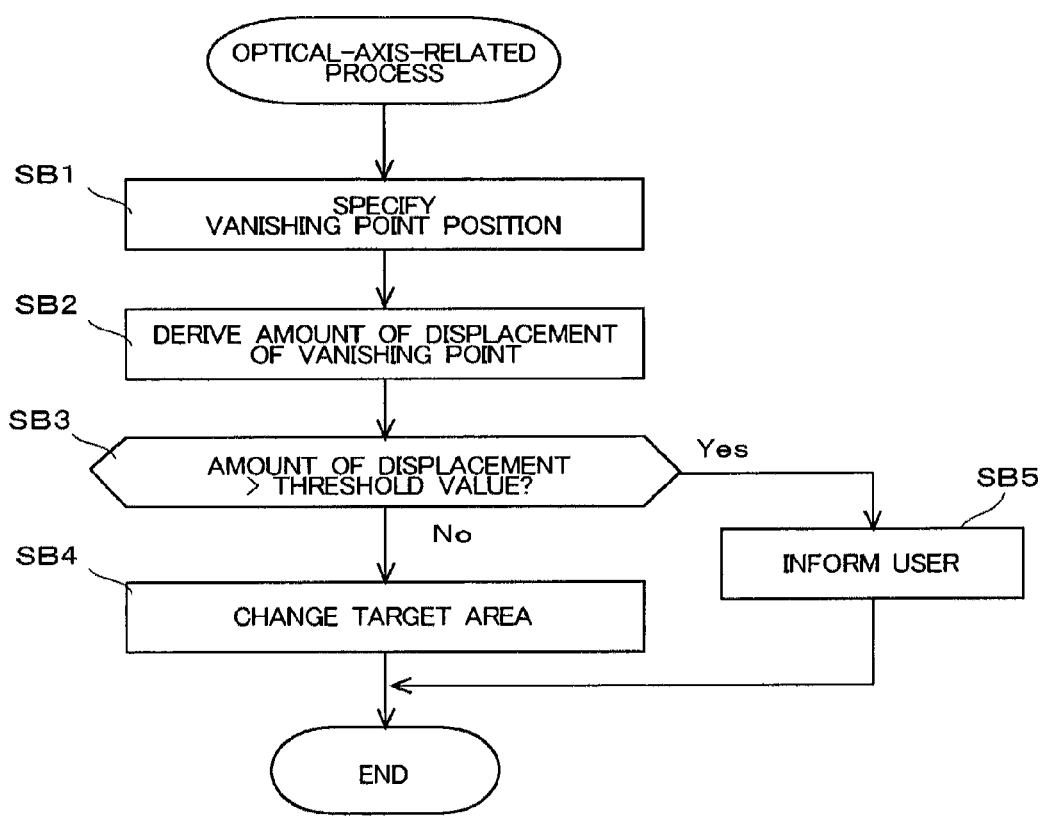
FIG. 9 shows a flow of an optical-axis-related process in a first embodiment.

FIG. 9 shows a flowchart of an optical-axis-related process that is one of processes preformed by the image recognition apparatus 2. In the optical-axis-related process, a response is made for the case where an optical axis of the camera 3 is displaced from an initial position. This optical-axis-related process is repeated in a relatively-long period cycle (e.g. one month).

<1-5-1. Collision-Warning Process>

First, a flow of a collision-warning process shown in FIG. 8 is explained. The camera 3 captures a forward view of the own vehicle 1 and obtains an outside-vehicle image showing a forward view of the own vehicle 1. This outside-vehicle image is input to the image processing part 21 through the signal receiver 30 (a step SA1).

Next, the area setting part 23 sets a target area in an outside-vehicle image (a step SA2). A position of the target area to be set is stored in RAM and the like in advance.

Next, the image recognition part 24 performs a recognition process by covering the target area in the outside-vehicle image. Thereby, the image recognition part 24 recognizes a preceding vehicle in a case where the preceding vehicle exists in front of the own vehicle 1 (a step SA3).

Next, the warning controller 25 derives a relative distance between the own vehicle 1 and the preceding vehicle and relative acceleration between the own vehicle 1 and the preceding vehicle based on the image of the recognized preceding vehicle. Then, the warning controller 25 derives a criterion value indicating a possibility of collision between the own vehicle 1 and the preceding vehicle based on the derived relative distance and the relative acceleration (a step SA4).

Next, the warning controller 25 judges whether the possibility of collision between the own vehicle 1 and the preceding vehicle is high or not. In other words, the warning controller 25 judges whether the criterion value indicating the possibility of collision is more than the predetermined threshold value or not (a step SA5).

In a case where the criterion value indicating the possibility of collision is more than the predetermined threshold value (Yes in the step SA5), the warning controller 25 transmits a signal to the speaker 5 so that the speaker 5 outputs warning sound inside a cabin of the own vehicle 1. Thereby, a warning is given to a user to avoid the collision (a step SA6). Such a warning makes it possible for the user to avoid the collision between the own vehicle 1 and the preceding vehicle.

In a case where the criterion value indicating the possibility of collision is less than the predetermined threshold value (No in the step SA5), the process is terminated without giving a warning.

<1-5-2. Optical-Axis-Related Process>

Next, a flow of an optical-axis-related process shown in FIG. 9 is explained. First, the position identifying part 26 derives a vanishing point position in an outside-vehicle image. Thereby, the position identifying part 26 substantively identifies the optical axis position of the camera 3 relative to the own vehicle 1 (a step SB1).

The position identifying part 26 derives an amount of change of the vanishing point position from a previous position in a case where the vanishing point position has changed from the previous position. In a case where a position of a target area has not been changed in the past, the vanishing point position in an outside-vehicle image (or the reference position) in a case where the optical axis position of the camera 3 is in the initial position can be used as the previous position.

Next, the displacement-amount deriving part 28 derives an amount of displacement of the vanishing point position from the reference position. Concretely, the displacement-amount deriving part 28 derives the amount of change of the vanishing point position from the reference position by accumulating the amounts of change of the vanishing point position derived in the past and this time. Thereby, the displacement-amount deriving part 28 substantively derives the amount of displacement of an optical axis position of the camera 3 relative to the own vehicle 1 from an initial position (a step SB2).

Next, the informing controller 29 judges whether the amount of displacement of the vanishing point is more than the predetermined threshold value or not (a step SB3). Thereby, the informing controller 29 substantively judges whether the amount of displacement of the optical axis position of the camera 3 from the initial position is more than the predetermined threshold value or not.

In a case where the amount of displacement of the vanishing point is less than the predetermined threshold value (No in the step SB3), in other words, in a case where the optical axis position of the camera 3 is not displaced largely from the initial position, the area changing part 27 changes a position of a target area in an outside-vehicle image. Concretely, based on the amount of change of the vanishing point position derived by the position identifying part 26, the area changing part 27 changes the position of the target area to be set by the area setting part 23 in the outside-vehicle image (a step SB4). Thereby, it is possible to recognize a preceding vehicle properly even though the optical axis of the camera 3 is displaced from the initial position. In this case, a user does not have to adjust the optical axis position of the camera 3.

On the other hand, in a case where the amount of displacement of the vanishing point is more than the predetermined threshold value (Yes in the step SB3), in other words, in a case where the optical axis position of the camera 3 is displaced largely from the initial position, the informing controller 29 informs a user that the optical axis position of the camera 3 is displaced largely from the initial position (a step SB5). Concretely, the informing controller 29 outputs a predetermined signal to the display 4 and the speaker 5 so that the display 4 and the speaker 5 inform that the optical axis position of the camera 3 needs to be adjusted. Thereby, it is possible to inform the user that the optical axis of the camera 3 is largely displaced to the degree that a preceding vehicle cannot be recognized accurately. Thus, the user can understand that an adjustment of the optical axis of the camera 3 is required.

As explained hereinbefore, in the image recognition apparatus 2 in this embodiment, the image recognition part 24 recognizes a preceding vehicle based on a target area in an outside-vehicle image obtained by the camera 3 installed in the own vehicle 1. Then the position identifying part 26 identifies an optical axis position of the camera 3 relative to the own vehicle 1 based on an outside-vehicle image, and the area changing part 27 changes the position of the target area in the outside-vehicle image according to the optical axis position of the camera 3. Thereby, it is possible to recognize the preceding vehicle properly based on the target area in the outside-vehicle image even though the optical axis position of the camera 3 is displaced.

<2. Second Embodiment>

Next, the second embodiment is explained. In a case where the optical axis position of the camera 3 is displaced largely from the initial position, the image recognition apparatus 2 in the first embodiment informs a user that the optical axis position of the camera 3 is displaced largely from the initial position. On the other hand, the image recognition apparatus 2 in the second embodiment automatically adjusts the optical axis position of the camera 3 in the case where the optical axis position of the camera 3 is displaced largely from the initial position. A configuration and a process flow of the image recognition apparatus 2 in the second embodiment are approximately the same as those in the first embodiment, and therefore, differences with the first embodiment are explained hereinbelow.

Figure 10:
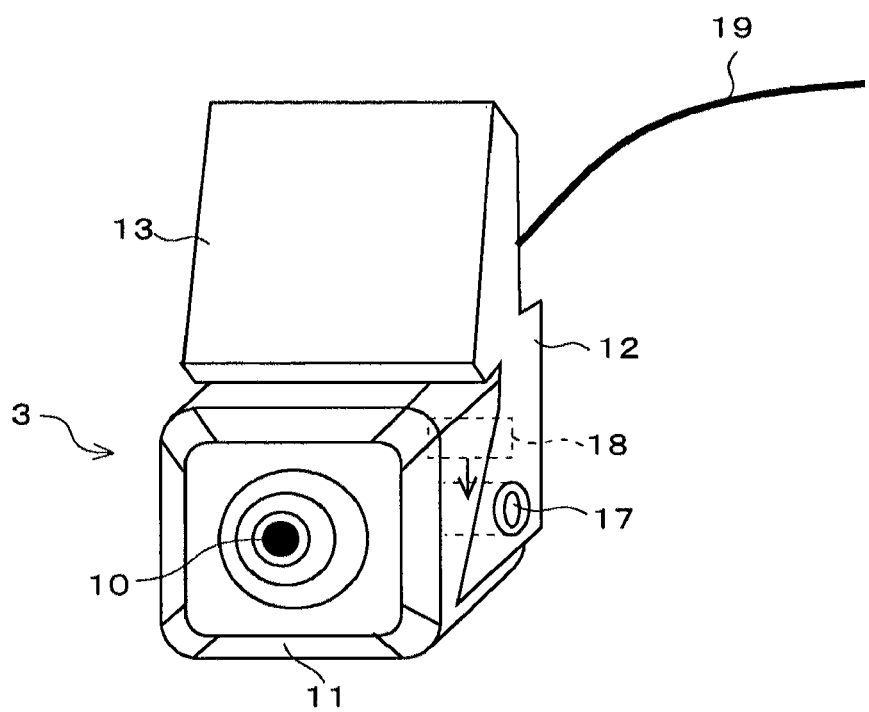
FIG. 10 shows a configuration of a camera in a second embodiment.

FIG. 10 shows a configuration of the camera 3 in the second embodiment. The camera 3 in the second embodiment includes a rotation axis 17 and a motor 18 instead of the screw 14 in the first embodiment. If the motor 18 is driven, the rotation axis 17 rotates. An angle relative to the holding part 12 of the chassis 11 including the optical lens 10 is changed by the rotation of the rotation axis 17. Therefore, for the camera 3 in this embodiment, it is possible to change a direction of the optical axis of the camera 3 relative to the own vehicle 1 by driving the motor 18.

Figure 11:
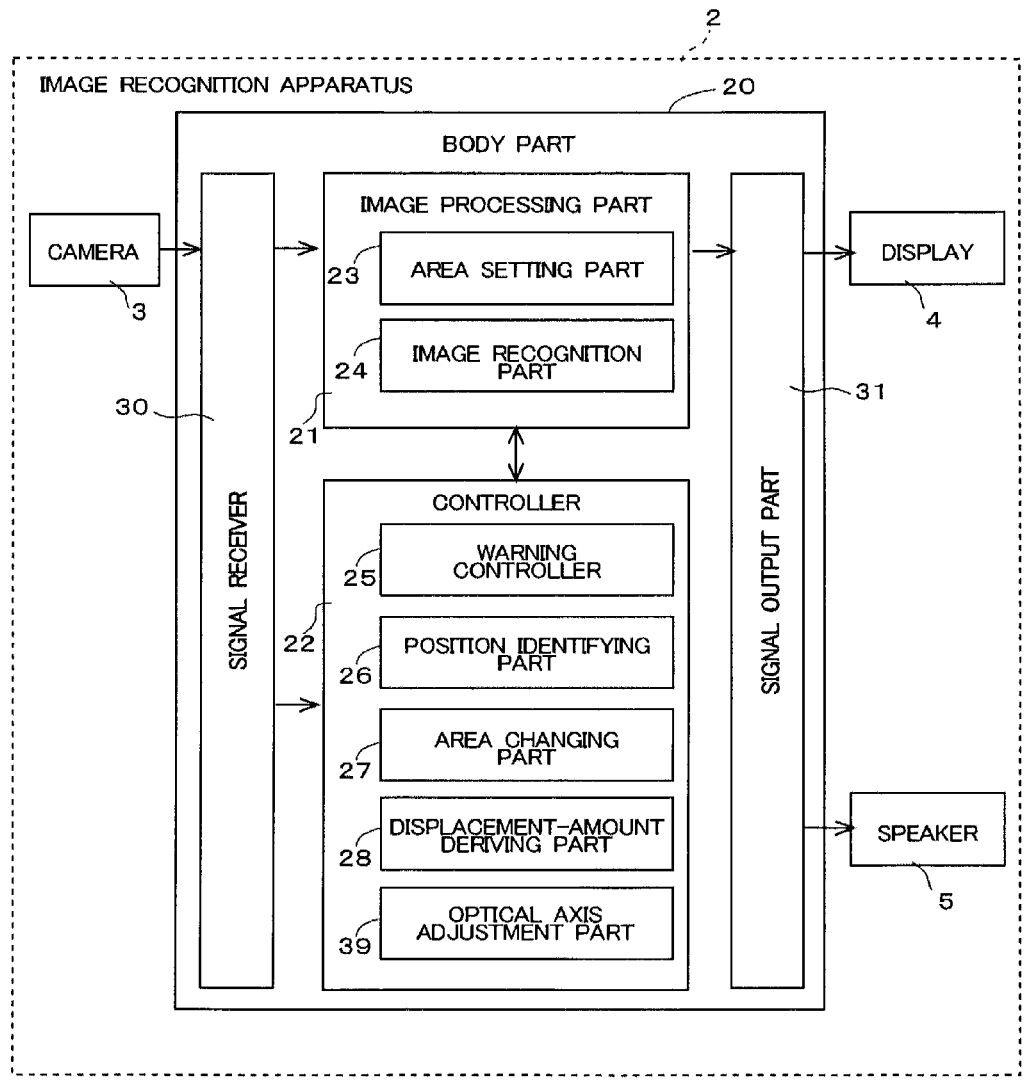
FIG. 11 mainly shows a configuration of a body part in a second embodiment.

FIG. 11 mainly shows a configuration of the body part 20 of the image recognition apparatus 2 in the second embodiment. The controller 22 in the second embodiment includes an optical axis adjustment part 39 instead of the informing controller 29 as a function performed by arithmetic processing.

The optical axis adjustment part 39 changes a direction of an optical axis of the camera 3 relative to the own vehicle 1 by transmitting a signal to the motor 18 of the camera 3. In a case where an amount of displacement of the optical axis position of the camera 3 from the initial position is more than the threshold value, the optical axis adjustment part 39 adjusts the optical axis position of the camera 3.

Figure 12:
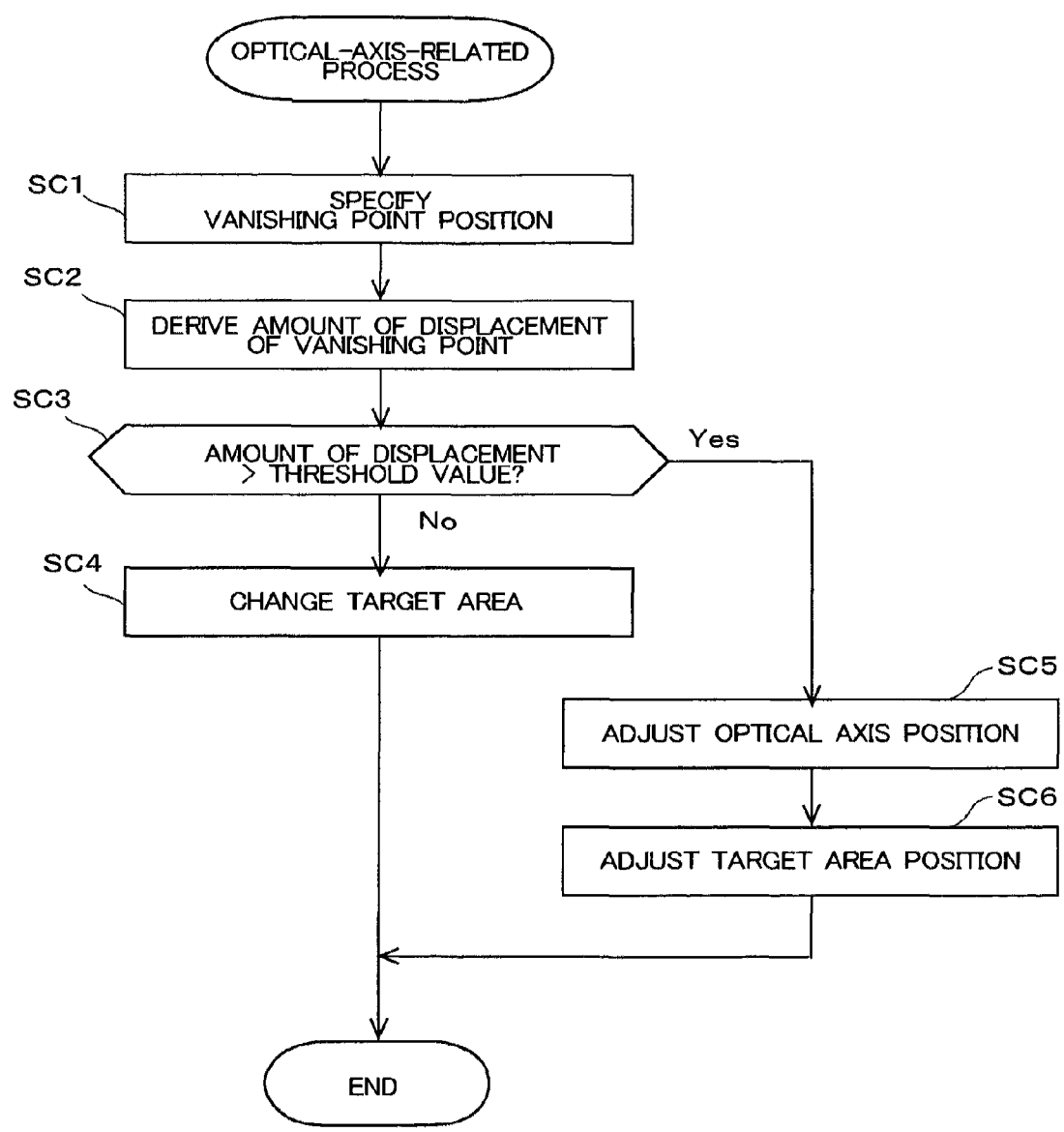
FIG. 12 shows a flow of an optical-axis-related process in a second embodiment.

FIG. 12 shows a flow of the optical-axis-related process in the second embodiment. The flow of the optical-axis-related process in the second embodiment is explained hereinbelow with reference to this figure. The process of a step SC1 to SC4 shown in FIG. 12 is the same as the process of the step SB1 to SB4.

In other words, first, the position identifying part 26 derives a vanishing point position in an outside-vehicle image. Also, in a case where the vanishing point position has changed from the previous position, the position identifying part 26 derives an amount of change of the vanishing point position from the previous position (a step SC1). Next, the displacement-amount deriving part 28 derives an amount of displacement of the vanishing point position from the reference position (a step SC2). Then, the optical axis adjustment part 39 judges whether the amount of displacement of the vanishing point is more than the predetermined threshold value or not (a step SC3).

In a case where the amount of displacement of the vanishing point is less than the predetermined threshold value (No in the step SC3), in other words, in a case where an optical axis position of the camera 3 is not displaced largely from the initial position, the area changing part 27 changes a position of a target area in an outside-vehicle image (a step SC4).

On the other hand, in a case where the amount of displacement of the vanishing point is more than the predetermined threshold value (Yes in the step SC3), in other words, in a case where the optical axis position of the camera 3 is displaced largely from the initial position, the optical axis adjustment part 39 adjusts the optical axis position of the camera 3 (a step SC5).

Concretely, the optical axis adjustment part 39 transmits a signal to the motor 18 of the camera 3 so that the motor 18 moves the optical axis of the camera 3. In this case, based on the amount of displacement of a vanishing point, the optical axis adjustment part 39 moves the optical axis of the camera 3 only by the amount corresponding to the amount of displacement of the vanishing point. In addition, the optical axis adjustment part 39 moves the optical axis of the camera 3 in the direction opposite to the direction where the optical axis of the camera 3 is displaced relative to the own vehicle 1. For example, in a case where the optical axis position of the camera 3 is displaced in the downward direction relative to the own vehicle 1, the optical axis adjustment part 39 moves the optical axis position of the camera 3 in the opposite direction, the upward direction. Thereby, the optical axis position of the camera 3 is returned to the initial position.

Next, the area changing part 27 also adjusts the position of the target area in an outside-vehicle image according to the optical axis position of the camera 3 after adjustment (a step SC6). Concretely, the area changing part 27 changes the position of the target area to the initial position including the reference position of the vanishing point. Thereby, it is possible to recognize a preceding vehicle properly.

In this way, in the image recognition apparatus 2 in this embodiment, the optical axis of the camera 3 is automatically adjusted even though the optical axis of the camera 3 is largely displaced to the degree that the preceding vehicle cannot be recognized properly. Thereby, a user can skip the step to adjust the optical axis position of the camera 3.

<3. Modification Examples>

The embodiments in the invention have been described so far. The invention is not limited to the above embodiments but possible to be applied to various embodiments. Hereinbelow, modifications are explained. Of course, each of the embodiments explained above and below can be arbitrarily combined with one or more of the others.

Figure 13:
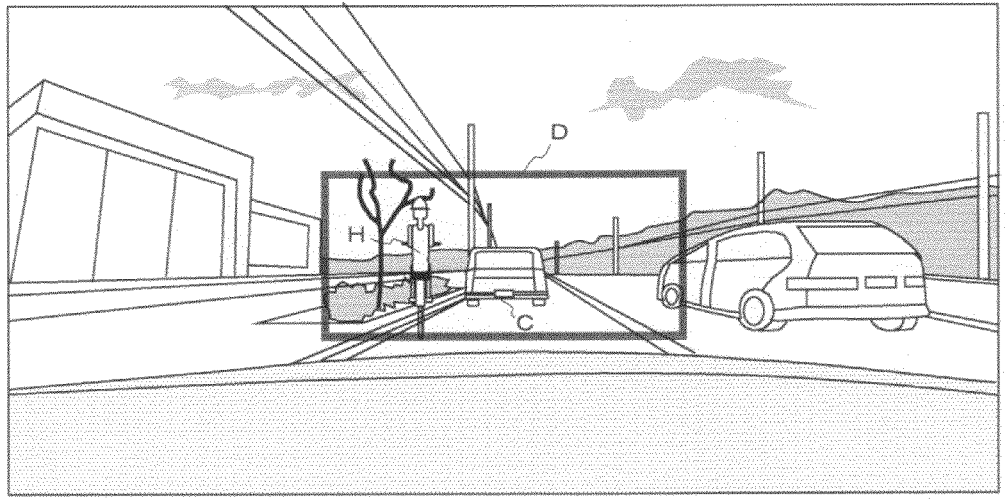
FIG. 13 shows an exemplary outside-vehicle image.

In the embodiments described above, the explanation is given as follows: a preceding vehicle C running in front of the own vehicle is recognized as an object based on the outside-vehicle image G as shown in FIG. 13. On the other hand, a vehicle H such as a bicycle and a motorcycle is allowed to be recognized as the object. Also, a thing other than a vehicle such as a pedestrian is allowed to be recognized as the object.

Figure 14:
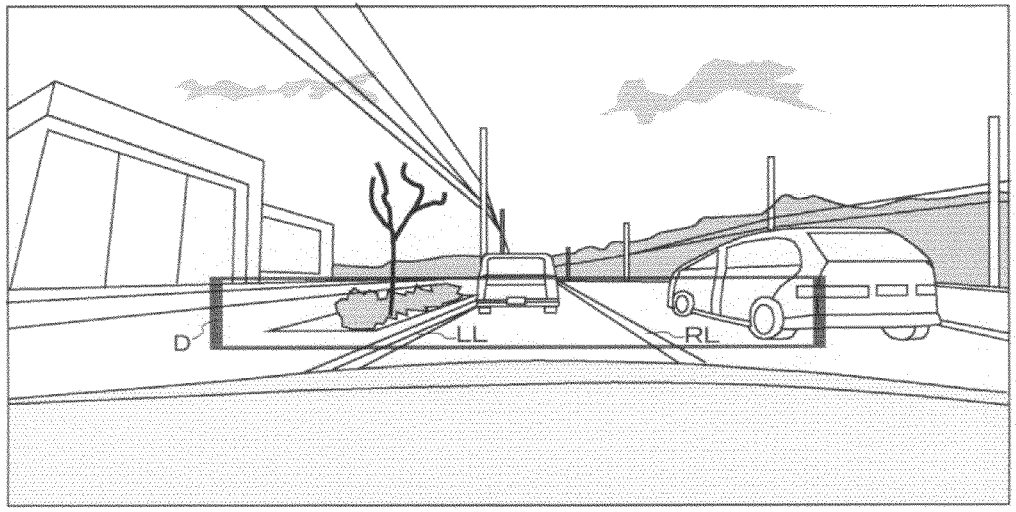
FIG. 14 shows an exemplary outside-vehicle image.

Not only a thing but also a pattern and the like on a surface of a thing and the like is allowed to be recognized as the object. For example, as shown in FIG. 14, a lane mark LL and RL that define the traffic lane in which the own vehicle 1 is running are allowed to be recognized as the object. In this way, in a case where lane marks are recognized, it is preferable to set the target area D below a vanishing point in the outside-vehicle image G as shown in FIG. 14. Thereby, it is possible to set the target area D in the position where there is a high probability of appearance of the lane mark LL and RL in the outside-vehicle image G.

In the case where the lane marks are recognized, the warning controller 25 examines, based on the lane marks, a possibility of lane departure of the own vehicle 1 from the traffic lane in which the own vehicle 1 is running, and if the lane departure is likely to be caused, it is allowed that the warning controller 25 warns a user that there is a high possibility of the lane departure. Concretely, the warning controller 25 derives a distance between the own vehicle 1 and the respective right and left lane marks LL and RL, and derives acceleration that the own vehicle 1 approaches one of two lane marks LL and RL. Then, the warning controller 25 derives a criterion value indicating the possibility of lane departure of the own vehicle 1 from the traffic lane based on the derived values. In a case where the criterion value is higher than the predetermined threshold value, the warning controller 25 warns a user to avoid the lane departure.

Also, in the above embodiments, the explanation is given as follows: the angle of view of the optical lens 10 of the camera 3 is 45 degrees. On the other hand, as the optical lens of the camera 3, it is allowed to adopt a wide-angle lens whose angle of view is relatively wide. It is preferable that the angle of view of such a wide-angle lens is more than 100 degrees, further preferable that the angle of view is more than 120 degrees, much further preferable that the angle of view is more than 180 degrees.

Figure 15:
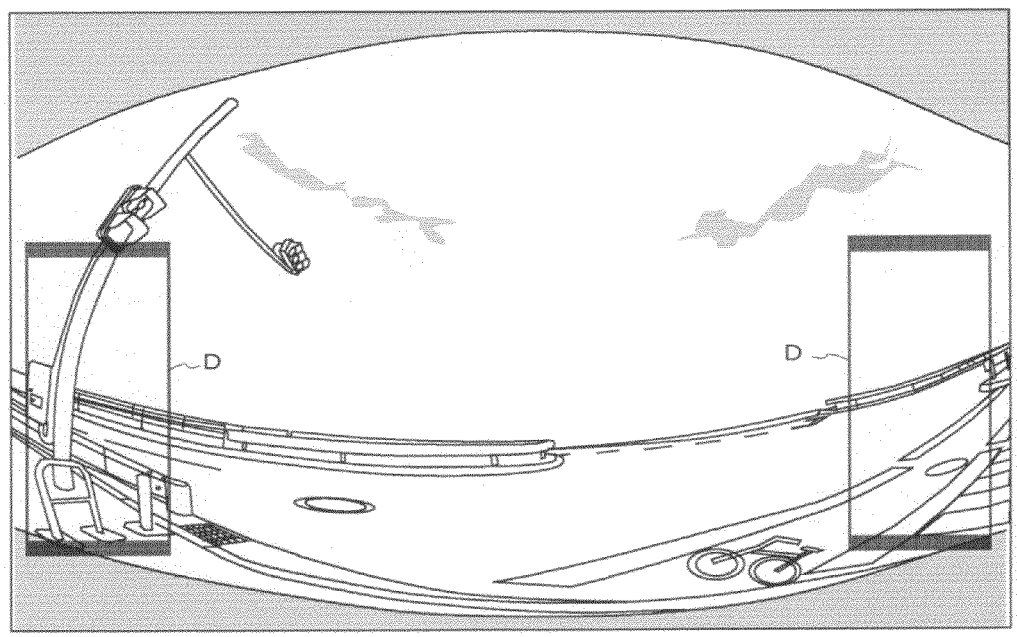
FIG. 15 shows an exemplary outside-vehicle image.

FIG. 15 shows an example of the outside-vehicle image G obtained by the camera 3 with a wide-angle lens. As shown in FIG. 15, in a case where the wide-angle lens is adopted, the outside-vehicle image G includes the wide area spreading right and left in front of the own vehicle 1 as a subject. In this case, as shown in FIG. 15, it is allowed to set the target areas D at the right side and the left side of the outside-vehicle image G respectively. As described above, it is possible to recognize an object existing on the right side or left side of the own vehicle 1, which easily becomes a blind area for a driver, by setting the target areas D on both sides of the right and the left side of the outside-vehicle image G. Thereby, a user can recognize an object such as a vehicle and a pedestrian approaching from a blind area when the own vehicle 1 enters an intersection with bad visibility, and the like. As a result, it is possible to avoid a collision with such a vehicle or a pedestrian.

Also, in the above embodiments, the explanation is given as follows: the camera 3 is installed on the inner surface of the windshield 15 and the optical axis of the camera 3 points ahead of the own vehicle 1. On the other hand, it is allowed to place the camera 3 on a sideview mirror of the own vehicle 1 so that the optical axis of the camera 3 points in the left-hand direction or the right-hand direction of the own vehicle 1.

Figure 16:
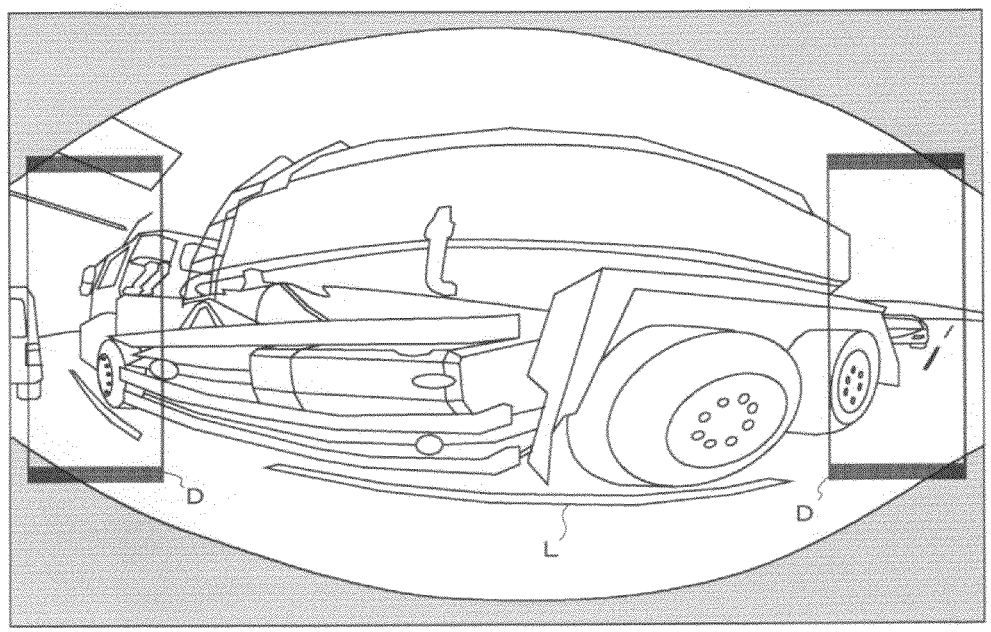
FIG. 16 shows an exemplary outside-vehicle image.

Thus, in a case where the optical axis of the camera 3 is pointed in the lateral direction of the own vehicle 1, it is preferable to adopt a wide-angle lens as the optical lens of the camera 3. FIG. 16 shows an example of the outside-vehicle image G obtained in a case where the optical axis of the camera 3 with a wide-angle lens is pointed in the right-hand direction of the own vehicle 1. In this case, as shown in FIG. 16, the outside-vehicle image G includes the area from the front to back on the right side of the own vehicle 1 as a subject. Also in this case, as shown in FIG. 16, it is preferable to set the target area D on the right and left side of the outside-vehicle image G respectively. Thereby, it is possible to recognize a vehicle, a pedestrian and the like approaching from a forward and backward area that easily become a blind area, as an object. Thereby, a user can recognize a vehicle running in the adjacent traffic lane and approaching the own vehicle 1, a pedestrian walking close to the own vehicle 1 and the like. As a result, it is possible to avoid a collision with such a vehicle and a pedestrian.

In this case where the optical axis of the camera 3 is pointed in the lateral direction of the own vehicle 1, it is difficult to figure out the vanishing point position in the outside-vehicle image G. Thus, it is allowed that the optical axis position of the camera 3 relative to the own vehicle 1 is substantively identified by recognizing the lane mark L defining the traffic lane in which the own vehicle 1 is running based on the outside-vehicle image G and by deriving the position of the lane mark L in the outside-vehicle image G.

It is allowed that the camera 3 is installed on the rear window of the own vehicle 1 and the optical axis of the camera 3 is pointed in the backward direction of the own vehicle 1. In this case, it is possible to recognize a vehicle approaching from the backward direction of the own vehicle 1 and a pedestrian existing behind the own vehicle 1, as an object.

Also, in the above embodiments, in a case where there is a high possibility of collision, a warning of high possibility of collision is given to a user to avoid the collision between the own vehicle 1 and an object. On the other hand, in the case where there is a high possibility of collision, it is allowed that the controller 22 transmits a predetermined signal to a vehicle controller that controls the behavior of the own vehicle 1 so that this vehicle controller controls the engine and the brake of the own vehicle 1 in order to avoid the collision between the own vehicle 1 and the object.

While the invention has been shown and described in detail, the foregoing description is in all aspects illustrative and not restrictive. It is therefore understood that numerous other modifications and variations can be devised without departing from the scope of the invention.

What is claimed is:

1. An image recognition apparatus that recognizes an object based on an image, the image recognition apparatus comprising:
   a recognition unit that recognizes the object based on a target area in an image obtained by a camera installed in a vehicle;
   an identifying unit that, during normal operation of the vehicle, identifies an optical axis position of the camera relative to the vehicle based on the image; and
   a changing unit that, during normal operation of the vehicle, changes a position of the target area in the image according to the optical axis position identified by the identifying unit.

2. The image recognition apparatus according to claim 1, further comprising:
   a derivation unit that derives an amount of displacement of the optical axis position from an initial position based on the image; and
   an informing unit that informs a user that the amount of displacement is more than a threshold value in a case where the amount of displacement is more than the threshold value, wherein
   the changing unit changes the position of the target area in the image in a case where the amount of displacement is less than the threshold value.

3. The image recognition apparatus according to claim 1, further comprising:
   a derivation unit that derives an amount of displacement of the optical axis position from an initial position based on the image; and
   an adjustment unit that adjusts the optical axis position in a case where the amount of displacement is more than a threshold value, wherein
   the changing unit changes the position of the target area in the image in the case where the amount of displacement is less than the threshold value.

4. The image recognition apparatus according to claim 1, wherein
   the changing unit changes the position of the target area in the image in a first direction opposite to a second direction, in a case where the optical axis position has changed in the second direction relative to a previous optical axis position.

5. The image recognition apparatus according to claim 1, wherein
the identifying unit identifies the optical axis position by deriving a vanishing point position in the image.

6. The image recognition apparatus according to claim 1, wherein
the object recognized by the recognition unit is another vehicle that is running in front of the vehicle in which the camera is installed.

7. The image recognition apparatus according to claim 6, wherein
the target area includes a vanishing point in the image.

8. The image recognition apparatus according to claim 1, wherein
the object recognized by the recognition unit is lane marks that define a traffic lane in which the vehicle runs.

9. The image recognition apparatus according to claim 3, wherein the adjustment device comprises a motor.

10. The image recognition apparatus according to claim 5, wherein
the identifying unit derives the vanishing point from an object commonly included in a plurality of consecutive outside-vehicle images.

11. An image recognition method for recognizing an object based on an image, the method comprising the steps of:
(a) recognizing the object based on a target area in an image obtained by a camera installed in a vehicle;
(b) during normal operation of the vehicle, identifying an optical axis position of the camera relative to the vehicle based on the image; and
(c) during normal operation of the vehicle, changing a position of the target area in the image according to the optical axis position identified in step (b).

12. The image recognition method according to claim 11, further comprising the steps of:
(d) deriving an amount of displacement of the optical axis position from an initial position based on the image; and
(e) informing a user that the amount of displacement is more than a threshold value in a case where the amount of displacement is more than the threshold value, wherein
the step (c) changes the position of the target area in the image in a case where the amount of displacement is less than the threshold value.

13. The image recognition method according to claim 11, further comprising the steps of:
(d) deriving an amount of displacement of the optical axis position from an initial position based on the image; and
(e) adjusting the optical axis position in a case where the amount of displacement is more than a threshold value, wherein
the step (c) changes the position of the target area in the image in a case where the amount of displacement is less than the threshold value.

14. The image recognition method according to claim 11, wherein
in the step (c), the position of the target area in the image is changed in a first direction opposite to a second direction, in a case where the optical axis position has changed in the second direction relative to a previous optical axis position.

15. The image recognition method according to claim 11, wherein
in the step (b), the optical axis position is identified by deriving a vanishing point position in the image.

16. The image recognition method according to claim 11, wherein
in the step (a), the object that is recognized is another vehicle that is running in front of the vehicle in which the camera is installed.

17. The image recognition method according to claim 16, wherein
the target area includes a vanishing point in the image.

18. The image recognition method according to claim 11, wherein
in the step (a), the object that is recognized is lane marks that define a traffic lane in which the vehicle runs.

19. The image recognition method according to claim 13, wherein
the optical axis position is adjusted by a motor.

20. The image recognition method according to claim 15, wherein
the vanishing point is derived from an object commonly included in a plurality of consecutive outside-vehicle images.

* * * * *